United States Patent
Takata et al.

(10) Patent No.: US 7,402,975 B2
(45) Date of Patent: Jul. 22, 2008

(54) MOTOR DRIVE DEVICE AND DRIVE METHOD

(75) Inventors: Go Takata, Hyogo (JP); Hideaki Mori, Hyogo (JP); Yasunori Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 17 days.

(21) Appl. No.: 11/548,500

(22) Filed: Oct. 11, 2006

(65) Prior Publication Data
US 2007/0126384 A1   Jun. 7, 2007

(30) Foreign Application Priority Data
Oct. 11, 2005   (JP)   ............... 2005-296381

(51) Int. Cl.
*H02P 1/24* (2006.01)
(52) U.S. Cl. .................. 318/727; 318/461; 318/599; 318/811
(58) Field of Classification Search .......... 318/727, 318/599, 811, 432, 434, 461
See application file for complete search history.

(56) References Cited

U.S. PATENT DOCUMENTS

| | | | |
|---|---|---|---|
| 4,868,479 A * | 9/1989 | Byong-Ho et al. | 318/721 |
| 5,309,078 A | 5/1994 | Cameron | |
| 6,315,081 B1 * | 11/2001 | Yeo | 187/290 |
| 6,700,343 B2 * | 3/2004 | Masaki et al. | 318/434 |
| 2003/0222615 A1 * | 12/2003 | Aono et al. | 318/625 |
| 2004/0201358 A1 * | 10/2004 | Kawaji et al. | 318/701 |

* cited by examiner

*Primary Examiner*—Rina I Duda
(74) *Attorney, Agent, or Firm*—RatnerPrestia

(57) ABSTRACT

A rise in the power supply voltage as a result of a sudden speed reducing command causing the motor current to flow to the power supply is prevented. The motor drive device has a drive signal generating unit for generating a drive signal by an energizing control unit, PWM control unit, and oscillation unit; a drive unit for producing drive power to drive the motor based on the drive signal; a torque control signal generating unit for generating a torque control signal specifying the motor torque; a speed detection unit for detecting the rotational speed of the motor and generating a rotational speed signal denoting motor speed information; and a decision unit for generating a speed difference detection signal denoting the difference between the torque control signal and the rotational speed signal. The drive signal generating unit is controlled based on the speed difference detection signal.

9 Claims, 11 Drawing Sheets

THREE-PHASE SYNCHRONOUS
RECTIFIER CONTROL

MOTOR DRIVE DEVICE AND DRIVE METHOD

BACKGROUND OF THE INVENTION

1. Field of Invention

The present invention relates to technology for preventing a rise in the power supply voltage in a drive circuit for driving a motor.

2. Description of Related Art

Pulse width modulation (PWM) drive methods that control energizing the motor coil by controlling the on/off state of specific switching devices in the motor drive circuit are commonly used to drive brushless motors in AV equipment. U.S. Pat. No. 5,309,078 (corresponding to Japanese Unexamined Patent Appl. Pub. H5-211780, and E.P. Publication No. 525, 999), for example, teaches a widely used synchronous rectifier PWM drive technology for achieving low loss and high efficiency PWM drive.

The PWM drive technology taught in U.S. Pat. No. 5,309,078 is described more fully below with reference to FIG. 12. FIG. 12 shows part of a three-phase motor system that is driven by a drive unit 305 composed of a three-phase bridge.

The voltage detected by detection resistance 324 and torque control signal VREF are input respectively to the inverted input node and the non-inverted input node of comparator 335. The torque control signal VREF controls the motor torque. The output node of the comparator 335 is connected to flip-flop circuit 336, and the inverted output of the flip-flop circuit 336 is input to two-phase non-superimposed clock generating unit 368. The two-phase non-superimposed clock generating unit 368 generates a pulse pair with a specific timing offset between the rising and failing edges in order to prevent current shoot-through in the drive unit 305. The output of the two-phase non-superimposed clock generating unit 368 is input to the energizing control unit 339 and synchronous rectifier control unit 340. The energizing control unit 339 supplies the drive signals that control the switching devices 325A, 325B, 325C to the high potential switching devices 325A, 325B, 325C, and the synchronous rectifier control unit 340 supplies the drive signals that control the low potential switching devices 326A, 326B, 326C to the low potential switching devices 326A, 326B, 326C.

Operation of this motor drive device is described next. The urging period is the period when drive power is supplied from the power source VM to the motor coils 310, 311, 312 by controlling the on state of the source phase (the phase in which motor current flows to the motor coil) high potential switching devices and the sink phase (the phase in which motor current flows from the motor coil) low potential switching devices. The regeneration period is the period in which the high potential switching devices that are on in the urging period are off. The drive unit 305 controls energizing the motor coils 310, 311, 312 through one cycle including an urging period and a regeneration period. The urging period and regeneration period include the offset timing generated by the two-phase non-superimposed clock generating unit.

For example, during the urging period node A is driven HIGH by high potential switching device 325A, node B is driven LOW by low potential switching device 326B, and node C is held in a high impedance state with both switching devices 325C and 326C off.

The motor current flowing through motor coils 310 and 311 between nodes A and B is converted to voltage by detection resistance 324. This voltage is compared by the comparator 335 with torque control signal VREF. If the voltage is greater than torque control signal VREF, the output of comparator 335 sets the flip-flop circuit 336 from which the inverted output is input to the two-phase non-superimposed clock generating unit 368. As a result, the output of the two-phase non-superimposed clock generating unit 368 is inverted, the energizing control unit 339 turns the switching device 325A on the high potential side of node A off, and synchronous rectifier control unit 340 turns the switching device 326A on the low potential side of node A on. At the same time the discharge circuit 341 releases switch 342 from specific voltage VS to start discharging. The discharge circuit 341 produces a time delay during which the high potential switching devices 325A, 325B, 325C are held off. When the capacitance voltage of the discharge circuit 341 becomes less than torque control signal VREF, the comparator 343 resets the flip-flop circuit 336, and again turns on the high potential switching device corresponding to the phase being driven.

As described above, if the low potential switching device 326A turns on when the high potential switching device 325A is off, the drive unit 305, and more particularly the motor coils 310 and 311, are shorted by two resistances, specifically the on resistors of low potential switching devices 326A and 326B. The motor current flows through a motor current path including motor coils 310 and 311 and switching devices 326A and 326B without passing any diodes. Using synchronous rectifier control can thus reduce the voltage drop produced in the current path of the motor current passing through motor coils 310 and 311 more than is possible with current regeneration using diodes. Low loss and high efficiency can thus be achieved.

Some problems with this related art are described below. More particularly, some problems with the current-controlled PWM drive method taught in U.S. Pat. No. 5,309,078 are described below with reference to FIG. 13 and FIG. 14. FIG. 13 shows the phase A portion of the drive unit 305, the phase A motor coil 310, and the detection resistance 324 shown in FIG. 12. Reference EA in FIG. 13 denotes a back electromotive force produced in the phase A motor coil proportionally to the rotational speed of the motor.

What happens when node A in FIG. 12 is driven HIGH by high potential switching device 325A, node B is driven low by low potential switching device 326B, switching devices 325C and 326C are off and node C is in a high impedance state, and torque control signal VREF is changed from a relatively high level (where back electromotive force EA is relatively high) to an extremely low level is considered below.

FIG. 14 is a timing chart describing the operation shown in FIG. 13. Periods T1 and T4 in FIG. 14 are the urging period in which drive power is supplied from the power source VM to the motor coil 310 through the phase A high potential switching device 325A, and periods T2 and T3 are the regeneration period in which motor current returns through the phase A low potential switching device 326A.

If torque control signal VREF falls sharply due to a reduce speed command, motor current IA1, which flows through phase A when the phase A high potential switching device is on, goes in a short time (period T1 in FIG. 14) to the maximum current level allowed by torque control signal VREF. As a result, the phase A high potential switching device goes off and the phase A low potential switching device goes on in a synchronous rectifier state, and motor current starts flowing as denoted by IA2 (in period T2 in FIG. 14). However, because the maximum current IP is low and the back electromotive force EA is high, the effect of the back electromotive force EA in the regeneration period causes the motor current to start flowing in the opposite direction, that is, in the direction of IA3 (period T3 in FIG. 14). The back electromotive force EA also causes the motor current IA3 to rise during the regeneration period, which is longer than the urging period due to the reduce speed command. As a result, after the next urging period starts, that is, when the phase A high potential switching device is on and the phase A low potential switching device is off, motor current IA4 flows back to the power source and causes the power supply voltage to rise (period T4 in FIG. 14).

A problem with the regeneration phase of the related art is that because motor current flows back to the power source after the next urging period starts, the power supply voltage rises and can lead to device damage. Reducing device size and cost is also difficult with the related art because a capacitance to improve the current sink capacity of the power supply, a zener diode for voltage clamping, or some other external protection device is required to prevent a rise in the power supply voltage.

SUMMARY OF THE INVENTION

The present invention is directed to solving this problem by preventing a power supply voltage rise caused by motor current flowing back to the power supply.

A motor drive device according to a preferred aspect of the present invention is a device operable to supply drive power to a motor to drive the motor, and has a drive signal generator operable to generate a drive signal, a driver operable to produce the drive power based on the drive signal, a torque control signal generator operable to generate a torque control signal specifying the motor torque, a speed detector operable to detect the rotational speed of the motor and to generate a rotational speed signal denoting motor speed information, and a speed difference detector operable to generate a speed difference detection signal denoting the difference between the torque control signal and the rotational speed signal. Said drive signal generator is controlled based on the speed difference detection signal.

A motor drive method according to another aspect of the invention is a method of supplying drive power to a motor to drive a motor and has steps of generating a drive signal, producing the drive power based on the drive signal, generating a torque control signal specifying the motor torque, detecting the rotational speed of the motor and generating a rotational speed signal denoting motor speed information, generating a speed difference detection signal denoting the difference between the torque control signal and the rotational speed signal, and controlling the drive signal based on the speed difference detection signal.

The motor drive device and drive method of the invention sense phenomena that cause the power supply voltage to rise instead of detecting the actual rise in the power supply voltage caused by motor current backflow to the power supply, and can therefore prevent the power supply voltage from rising. The supply voltage therefore does not rise even when a sudden reduce speed command is asserted or there is a load change, and damage to switching devices can be prevented.

Furthermore, the size and cost of the motor drive device can also be reduced because devices such as capacitors or zener diodes to cope with a power supply voltage rise are not needed.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Preferred embodiments of a motor drive device according to the present invention are described below with reference to the accompanying figures. The numbers used in the following description of the invention are used by way of example only to describe the invention in detail, and the invention is not limited to these values.

First Embodiment

A motor drive device according to this first embodiment of the invention drives a three-phase motor by supplying drive power for driving the motor based on PWM (pulse width modulation) control of each phase coil of the motor.

In the first embodiment of the invention motor control content changes when the level of the torque control signal that sets the torque level of the motor goes below the level of the rotational speed signal that denotes the speed of the motor. This prevents the backflow of the motor current flowing through the motor coil, and prevents a rise in the power supply voltage that could result in damage to other components.

Figure 1:
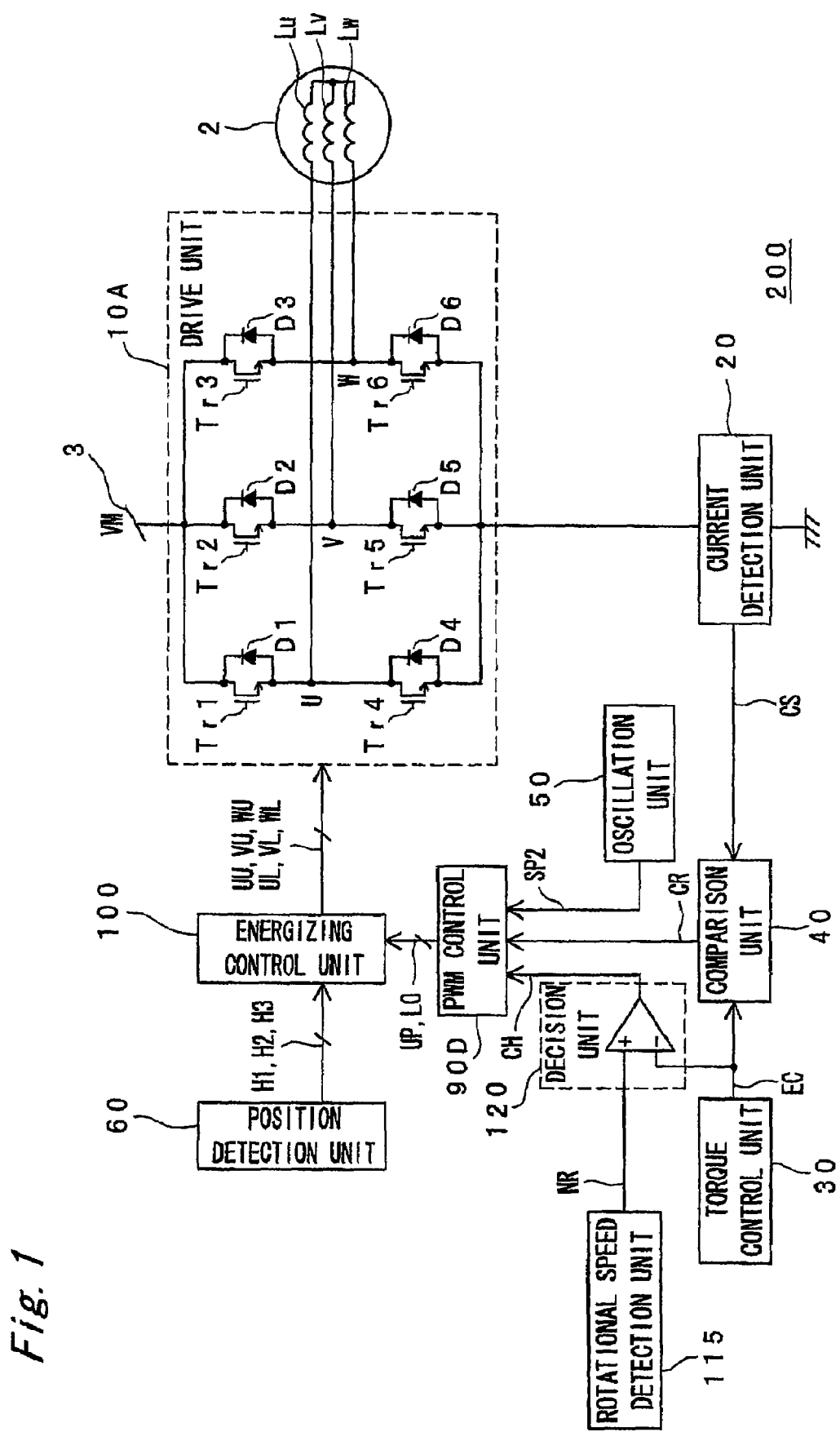
FIG. 1 is a block diagram of a motor drive device 200 according to a first embodiment of the invention.

The first embodiment of the invention is described with reference to FIG. 1 to FIG. 4. FIG. 1 is a block diagram of the motor drive device 200 in this first embodiment of the invention. The motor drive device 200 according to this first embodiment of the invention includes a power supply 3, a drive unit 10A, a current detection unit 20, a torque control unit 30, a comparison unit 40, an oscillation unit 50, a position detection unit 60, a PWM control unit 90D, an energizing control unit 100, a rotational speed detection unit 115, and a decision unit 120, and drives a motor 2.

The motor 2 that is driven by this motor drive device 200 has a rotor and a stator. The rotor has a field unit rendered by a permanent magnet not shown. The stator has motor coils Lu, Lv, Lw for phase U, phase V, and phase W in a Y-connection.

The drive unit 10A is connected between ground and the power supply 3 of voltage VM, and is composed of three parallel half-bridge circuits each having a high potential side switching device and low potential side switching device connected in series.

In this drive unit 10A the half-bridge circuit that controls energizing motor coil Lu is composed of switching device Tr1 connected on the high potential side and switching device Tr4 connected on the low potential side, the half-bridge circuit that controls energizing motor coil Lv is composed of switching device Tr2 connected on the high potential side and switching device Tr5 connected on the low potential side, and the half-bridge circuit that controls energizing motor coil Lw is composed of switching device Tr3 connected on the high potential side and switching device Tr6 connected on the low potential side.

These switching devices Tr1, Tr2, Tr3, Tr4, Tr5, Tr6 switch according to the logic level of the drive signals UU, VU. WU, UL, VL, WL (referred to as drive signals UU-WL below) respectively output thereto from the energizing control unit 100 to produce the drive power for driving the motor 2. The high potential side switching devices Tr1, Tr2, Tr3 are respectively controlled by high potential drive signals UU, VU, WU, and the low potential side switching devices Tr4, Tr5, Tr6 are respectively controlled by low potential drive signals UL, VL, WL.

A MOS transistor, bipolar transistor, or insulated gate bipolar transistor (IGBT), for example, can be used for switching devices Tr1 to Tr6. In this embodiment of the invention switching devices Tr1 to Tr6 are n-channel MOS transistors.

When switching devices Tr1 to Tr6 are on, the logic level of the drive signals UU-WL is at the operating level, which in this first embodiment of the invention is HIGH. When switching devices Tr1 to Tr6 are off, the logic level of the drive signals UU-WL is at the non-operating level, which in this first embodiment of the invention is LOW.

The current detection unit 20 is connected between ground and the drive unit 10A, detects the amount of current flowing through the drive unit 10A, and outputs current detection signal CS denoting the result to the comparison unit 40.

The torque control unit 30 outputs the torque control signal EC that sets the amount of torque applied to the motor 2 to the comparison unit 40. The torque control unit 30 is also referred to as a torque control signal generating unit.

The comparison unit 40 then compares the torque control signal EC and current detection signal CS, and outputs reset signal CR representing the result to the PWM control unit 90D.

The oscillation unit 50 outputs set signal SP2, the frequency of which is the second PWM frequency, to the PWM control unit 90D.

The energizing control unit 100, PWM control unit 90D, and oscillation unit 50 render a drive signal generating unit.

The rotational speed detection unit 115 detects the rotational speed of the motor 2, and produces and outputs a rotational speed signal NR denoting the motor speed to the decision unit 120. The decision unit 120 is also called a speed difference detection unit.

The arrangement for acquiring information about the rotational speed of the motor 2 could detect the rotational position of the rotor using Hall effect devices or other magnetic sensors and convert this position information to the rotational angle per time unit. Alternatively, the arrangement could detect the level of back electromotive force based on the terminal voltage detected from the motor 2 terminals and determine the speed proportional to this back electromotive force. Further alternatively, the rotational position of the rotor could be detected based on the back electromotive force and converted to a rotational angle per time unit. This rotational speed information is a timing pulse of a frequency proportional to the rotational speed, for example, and is converted by an integration circuit, for example, to a voltage that is proportional to the rotational speed of the motor 2 and is output as rotational speed signal NR.

The decision unit 120 compares torque control signal EC and rotational speed signal NR, and outputs the result of this comparison as speed difference detection signal CH to the PWM control unit 90D.

Before being input to the decision unit 120 the rotational speed signal NR can be passed through a low-pass filter, for example, to remove noise and prevent operating errors in the decision unit 120 and downstream.

Based on the speed difference detection signal CH, set signal SP2, and reset signal CR, the PWM control unit 90D generates and outputs to the energizing control unit 100 a high potential side drive signal UP and a low potential side drive signal LO for a desired phase where both drive signals have a non-superimposed period for preventing drive unit 10A shoot-through.

The position detection unit 60 outputs position detection signals H1, H2, H3 representing the position of the motor 2 rotor to the energizing control unit 100.

The energizing control unit 100 generates and outputs to the drive unit 10A drive signals UU-WL for the switching devices Tr1 to Tr6 in the drive unit 10A based on the position detection signals H1, H2, H3, high potential side drive signal UP, and low potential side drive signal LO.

The phase in which motor current is supplied to the motor coil is called the "source phase" below and the motor current at this time is called the "source current," and the phase in which motor current flows from the motor coil is called the "sink phase" and the motor current at this time is called the "sink current."

A motor drive device according to this embodiment of the invention applies motor current at a current level determined by the torque control signal EC to a desired phase as the source current (or sink current) for a 120° electrical angle period. The coil is not energized for the next 60° period, and the current level goes to zero. The sink current (or source current) is then applied next in the same energizing pattern. A rectangular wave phase current is thus applied with a 120° electrical angle shift between each of the three phases. At any particular time the source current is therefore supplied to one phase (the source phase) and the sink current is supplied to another phase (the sink phase). As a result, two phases are energized and the remaining one phase is not energized in an energizing pattern referred to below as a "120° energizing method."

Figure 2:
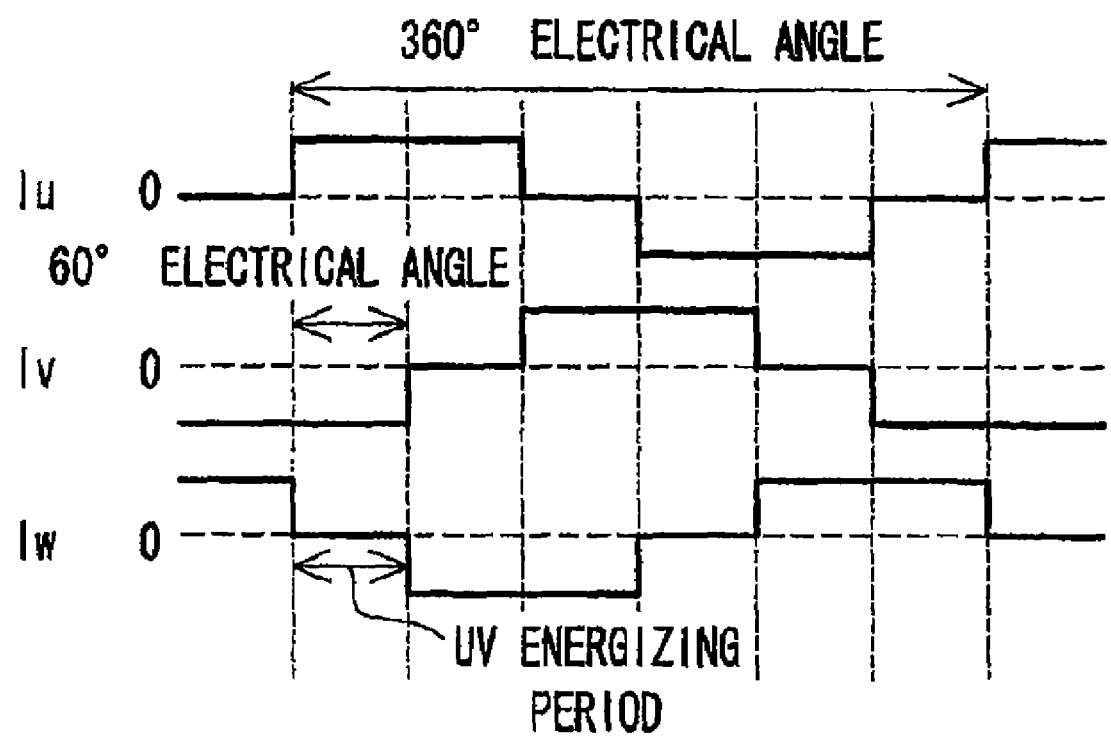
FIG. 2 is a timing chart describing the operation of the drive unit 10A in FIG. 1.

FIG. 2 is a timing chart describing the energizing states of the drive unit 10A. In the example shown in FIG. 2 the U phase current is the source current, the V phase current is the sink current, and the 60° electrical angle period when the W phase current is 0 is called the "UV energizing period."

The urging period is the period when drive power is supplied from the power supply 3 to the motor coils Lu, Lv, Lw by turning the high potential side switching device of the source phase and the low potential side switching device of the sink phase on, and the drive state at this time is called the "urging state."

The regeneration period is the period in which the high potential side switching device of the source phase that is on during the urging period is off. During this time the motor current flowing to the motor coil flows through the low potential side switching device that is on in the source phase or a diode that is parallel connected to this switching device, and the low potential side switching device of the sink phase. The state of the motor drive device during the regeneration period is called the "regeneration state."

The urging state and regeneration state thus repeat in cycles composed of an urging period and a regeneration period as the motor drive device in this embodiment of the invention controls energizing the motor coils Lu, Lv, Lw. The urging period or regeneration period includes a non-superimposed period to prevent drive unit 10A shoot-through, but the non-superimposed period can be shorter than the urging period or regeneration period and is omitted in the following description unless otherwise noted. More particularly, control whereby the low potential side switching device of the source phase that is on in the urging period is on in the regeneration state of the regeneration period SD that the motor current passes through the low potential side switching device of the sink phase and this lower resistance low potential side switching device of the source phase instead of a diode is called "synchronous rectifier control."

Based on position detection signals H1, H2, H3, the energizing control unit 100 determines the two energized phases with one phase being the source phase and another phase being the sink phase. The energized phases are determined every 60' electrical angle period. When the source phase is driven by PWM, so-called synchronous rectifier control turns the low potential side switching device on for a predetermined period to prevent shoot-through after the high potential side switching device is turned off in the regeneration period in which the high potential side transistor is off. In the sink phase, the high potential side switching device is always off, the low potential side switching device is on, and both the high potential side and low potential side switching devices are off for the remaining phase that is not energized.

The operation of each element in the motor drive device according to this embodiment of the invention is described below.

The drive unit 10A is composed of six switching devices Tr1 to Tr6 in a bridge connection, and a diode D1, D2, D3, D4, D5, D6 is inversely parallel connected to each of the switching devices Tr1 to Tr6. One terminal of motor coil Lu is connected to the node between switching device Tr1 and switching device Tr4, one terminal of motor coil Lv is connected to the node between switching device Tr2 and switching device Tr5, and one terminal of motor coil Lw is connected to the node between switching device Tr3 and switching device Tr6 in this drive unit 10A. The switching devices Tr1 to Tr6 switch on/off according to the logic level of the drive signals UU-WL from the energizing control unit 100, and supply PWM switched drive power from the power supply 3 to the motor coils Lu, Lv, Lw.

The current detection unit 20 includes a detection resistance and amplifier, for example, and detects the amount of current flowing from the drive unit 10A as a voltage. The detected result is output to the comparison unit 40 as current detection signal CS.

The torque control unit 30 outputs a torque control signal EC, which denotes the target level for how much torque should be applied to the motor 2, to the comparison unit 40.

The comparison unit 40 compares the level of this torque control signal EC with the level of the current detection signal CS, and outputs reset signal CR as the result to the PWM control unit 90D. The comparison unit 40 is a comparator, for example.

The oscillation unit 50 outputs a set signal SP2 to the PWM control unit 90D. This set signal SP2 is a timing signal for setting one of high potential side drive signal UU, VU, WU. The oscillation unit 50 is a phase-locked loop, for example. The second PWM frequency of the set signal SP2 can be a constant frequency or a variable frequency that changes with the torque control signal EC level, for example.

The position detection unit 60 outputs position detection signals H1, H2, H3 denoting the position of the rotor in the three phases of the motor 2 to the energizing control unit 100. The position detection signals H1, H2, H3 can be generated using Hall effect devices or other sensors, or by a sensorless arrangement using the back electromotive force produced in the motor coils Lu, Lv, Lw, and the detection arrangement is not specifically limited. An arrangement that involves the rotational speed detection unit 115 can also be used, The position detection signals H1, H2, H3 correspond to the rotor position in each of the three phases, and are therefore signals with a 120° electrical angle offset between each signal.

Figure 3:
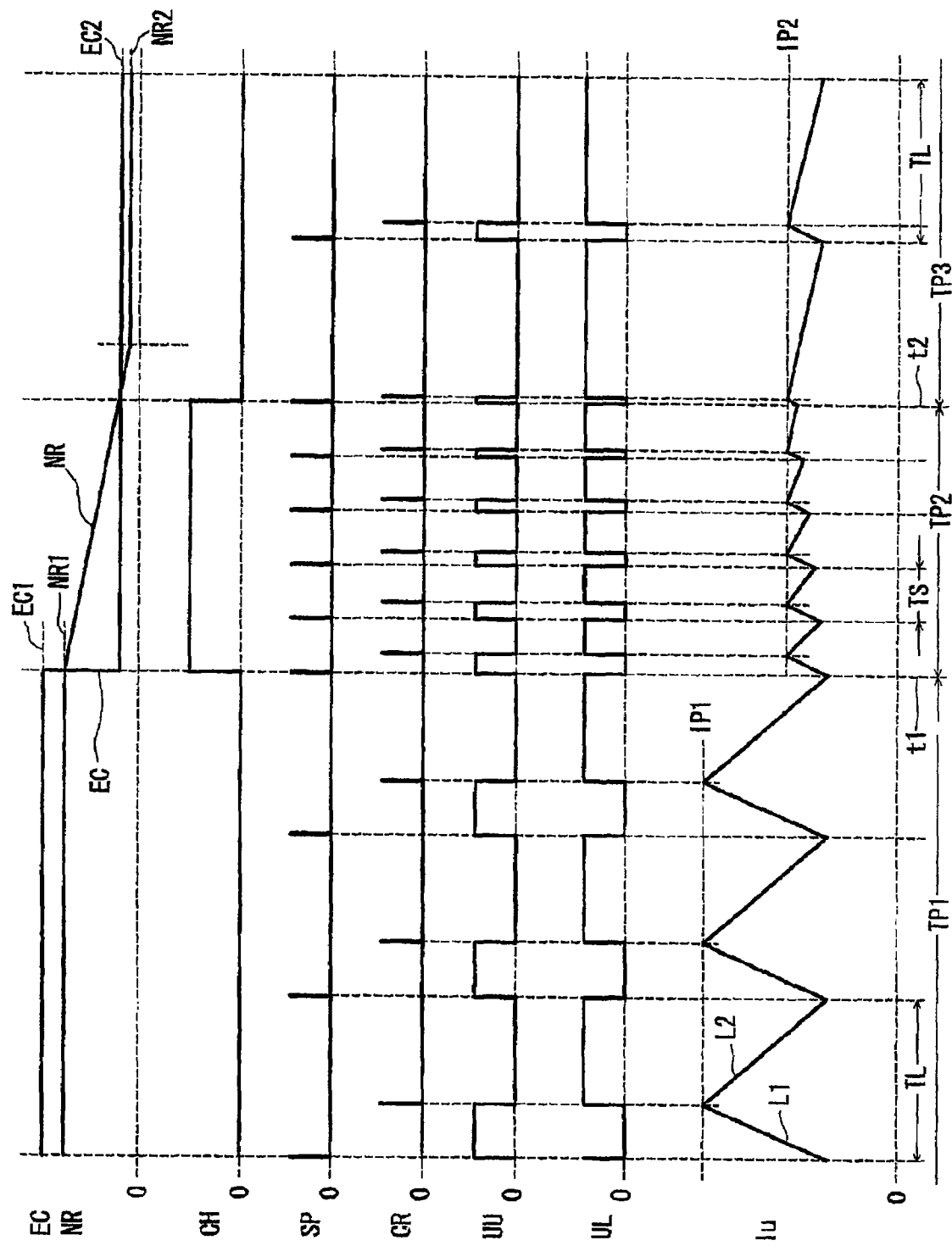
FIG. 3 is a timing chart describing the operation of the decision unit 120 and PWM control unit 90D in FIG. 1.

The decision unit 120 is a comparator, for example, that operates as shown in FIG. 3.

At time t1 the torque control signal EC is a constant EC1. The corresponding rotational speed signal NR is a level NR1 below the torque control signal EC1 due to rotation loss. If torque control signal EC steps down from EC1 to EC2 at time t1, the motor 2 gradually slows. As a result, the rotational speed signal NR also drops linearly from NR1 to NR2 because motor 2 inertia means that time is required to reach the predetermined speed when the torque control signal EC indicates a sharp speed reduction. As a result, rotational speed signal NR is greater than torque control signal EC from time t1 to time t2. After time t2 the torque control signal EC holds steady at EC2, and the rotational speed signal NR goes to NR2 below torque control signal EC2. The speed difference detection signal CH goes HIGH when the torque control signal EC is below the rotational speed signal NR. More specifically, the speed difference detection signal CH goes from LOW to HIGH at time t1 and returns to LOW at time t2.

Figure 4:
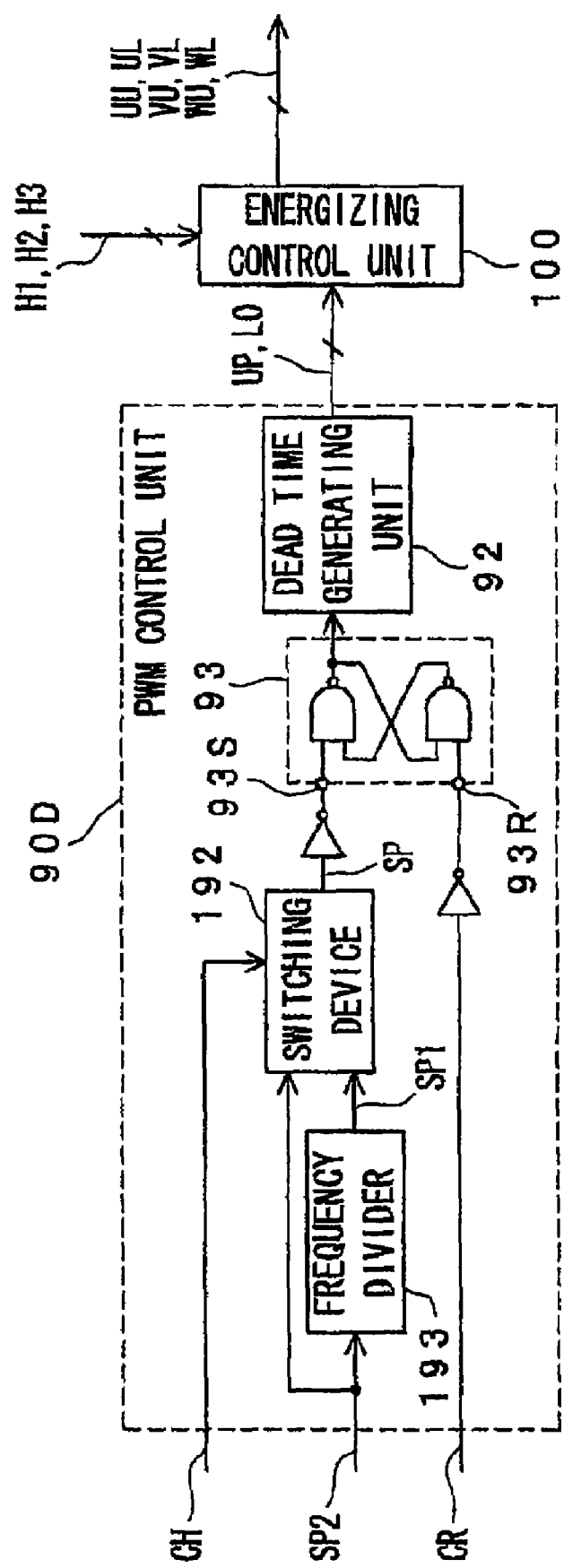
FIG. 4 is a circuit diagram showing a specific arrangement of the PWM control unit 90D in FIG. 1.

FIG. 4 is a circuit diagram showing a specific arrangement for the PWM control unit 90D. The PWM control unit 90D includes a dead time generating unit 92, a flip-flop 93, a switching device 192, and a frequency divider 193.

The set signal SP2 is a pulse signal of second PWM frequency 1/TS that is input to the frequency divider 193 and switching device 192. The frequency divider 193 frequency divides set signal SP2 to first PWM frequency and outputs frequency-divided output SP1 to the switching device 192. The frequency-divided output SP1 is a pulse signal of first PWM frequency 1/TL, which is lower than the second PWM frequency 1/TS of the set signal SP2.

The switching device 192 is a selector that outputs either set signal SP2 or frequency-divided output SP1 as the new set signal SP. The switching device 192 selects and outputs set signal SP2 when the speed difference detection signal CH is HIGH, and selects and outputs frequency-divided output SP1 when the speed difference detection signal CH is LOW, but is not limited to this arrangement. More specifically, when the speed difference detection signal CH is HIGH, the set signal SP is a pulse signal of second PWM frequency 1/TS, and is a pulse signal of first PWM frequency 1/TL when the speed difference detection signal CH is LOW. The inverted set signal SP is input to set pin 93S of the flip-flop 93, and the inverted reset signal CR is input to the reset pin 93R of the flip-flop 93.

Based on output from the flip-flop 93, the dead time generating unit 92 generates and outputs to the energizing control unit 100 a high potential side drive signal UP and a low potential side drive signal LO for a desired phase where both drive signals have a non-superimposed period for preventing drive unit 10A shoot-through.

Note that the first PWM frequency is also referred to as the "first frequency" and the second PWM frequency is also referred to as the "second frequency" herein.

Based on the high potential side drive signal UP, low potential side drive signal LO, and position detection signals H1, H2, H3, the energizing control unit 100 generates and outputs to the drive unit 10A drive signals UU-WL for 120° energizing. During the UV energizing period, for example, high potential side drive signal UP and low potential side drive signal LO are output to the drive unit 10A as drive signals UU and UL applied to switching devices Tr1 and Tr4. During the UV energizing period VL is HIGH and VU, WU, and WL are LOW.

The operation of this first embodiment in the UV energizing period is described next with reference to FIG. 3, FIG. 4, and FIG. 1.

Referring to FIG. 3, the speed difference detection signal CH is LOW in period TP1 to time t1, and the frequency of the set signal SP is first PWM frequency 1/TL. When the set signal SP goes HIGH in period TP1, the flip-flop 93 is set and output from the flip-flop 93 passes through the dead time generating unit 92 and energizing control unit 100 and drives drive signal UU HIGH and drive signal UL LOW. As a result, switching device Tr1 goes on and switching device Tr4 goes off in the urging state. During this urging state the source current is supplied from the power supply 3 to motor coil Lu and the sink current is supplied to motor coil Lv. The U phase motor current Iu rises as indicated by line L1 in FIG. 3. Line L1 is actually a curve, and the average slope of the curve depends on the power supply 3 voltage VM and the inductance and winding resistance of the motor coil.

The level of the U phase motor current Iu is converted by the detection resistance to current detection signal CS denoting a voltage, and is compared by the comparison unit 40 with the torque control signal EC. If the current detection signal CS level reaches maximum current IP1 corresponding to torque control signal EC1, the reset signal CR goes HIGH and the flip-flop 93 is reset. As a result, drive signal UU goes LOW, drive signal UL goes HIGH, switching device Tr1 goes off, switching device Tr4 goes on, and the regeneration state is assumed. In the regeneration period the motor current flows through the current path of switching device Tr4, switching device Tr5, and motor coils Lu and Lv with the U phase being the source and the V phase being the sink side. This motor current attenuates over time as indicated by line L2 due to the effect of the coil resistance, the inductance of the motor coils Lu and Lv, and the back electromotive force that is proportional to the speed of the motor 2. Line L2 is actually a curve, and the average slope of the curve depends on the back electromotive force level, that is, the rotational speed signal NR and the inductance and winding resistance of the motor coil.

The set signal SP that is generated every period TL sets the flip-flop 93 and causes switching device Tr4 to turn off and switching device Tr1 to turn on, thus starting the next urging period. Switching device Tr1 becomes the source, switching device Tr5 becomes the sink side, drive power is supplied to motor coils Lu and Lv, and U phase motor current Iu begins rising again.

By repeating this cycle TL during period TP1, the U phase motor current Iu becomes a sawtooth wave with period TL and maximum current level IP1. Because the PWM frequency is generally set in range from several ten kilohertz to several hundred kilohertz for PWM control, current does not flow in the regeneration period in the opposite direction as during the urging period.

Period TP1 is a period in which the torque control signal EC is greater than the rotational speed signal NR, and is called the normal rotation period.

In period TP2 from time t1 to time t2, the torque control signal EC gradually steps down from EC1 to EC2. The rotational speed signal NR decreases from NR1 corresponding to the normal speed of rotation to NR2 corresponding to low speed rotation. Because the torque control signal EC is lower than rotational speed signal NR, speed difference detection signal CH goes HIGH, The frequency of the set signal SP is second PWM frequency 1/TS, which is higher than first PWM frequency 1/TL. The maximum current level IP goes to IP2, which is lower than IP1 and corresponds to torque control signal EC2. In this state the U phase motor current Iu is a sawtooth wave of period TS and maximum current level IP2. During the regeneration period the rotational speed signal NR gradually decreases, the back electromotive force also gradually decreases, and the slope of the U phase motor current Iu gradually becomes more gradual. This slope is greatest immediately after time t1 and is substantially equal to the slope of line L2. In extreme cases there is substantially no urging period after time t1 and only a regeneration period. To prevent backflow in this situation, period TL is set approximately equal to the regeneration period assuming the regeneration period continues until Iu goes from Iu=IP1 immediately after time t1 to Iu=0.

Period TP2 is the period in which the torque control signal EC is below the rotational speed signal NR, and is also called the speed-reducing period.

In period TP3 after time t2, torque control signal EC remains at EC2 and the rotational speed signal NR drops to NR corresponding substantially to the low speed of rotation. Because the torque control signal EC is above the rotational speed signal NR, speed difference detection signal CH goes LOW. The frequency of the set signal SP is first PWM frequency 1/TL. The maximum current level IP remains IP2. In this state the U phase motor current Iu is a sawtooth wave of period TL and maximum current level IP2. During the regeneration period the rotational speed signal NR is NR corresponding substantially to low speed rotation, back electromotive force is extremely low, and the slope of the U phase motor current Iu is gradual, In addition, just before time t2 there is only a slight drop in the U phase motor current Iu from maximum current level IP2, and the urging period immediately after time t2 is also short. To prevent backflow in this situation, period TL is set approximately equal to the regeneration period assuming the regeneration period continues until Iu goes from Iu=IP1 immediately after time t2 to Iu=0.

Period TP3 is a period in which the torque control signal EC is greater than the rotational speed signal NR, and is called the normal rotation period.

Period TL can be set to prevent current backflow in periods TP1 and TP3 by setting TL to the shorter of the settings used in period TP1 and TP3.

If the first PWM frequency 1/TL is set to the frequency during normal rotation, the drive unit 10A can be PWM controlled at the second PWM frequency that is twice the frequency dividing ratio of the frequency divider 193 greater than the first PWM frequency during the speed reducing period in which the torque control signal EC is lower than the rotational speed signal NR. When the rotational speed signal NR then drops and the normal rotation period in which the torque control signal EC is higher than the rotational speed signal NR returns, the speed difference detection signal CH goes LOW and the drive unit 10A is therefore again PWM controlled at the first PWM frequency.

The torque control signal EC thus decreases gradually in steps according to the reduce speed command during the speed reducing period in which the torque control signal EC level is below the rotational speed signal NR level. The urging period therefore also decreases in steps. If the PWM frequency remains constant, the regeneration period becomes longer compared to period TP1. The rotational speed signal NR also gradually attenuates, the back electromotive force also gradually attenuates, and the slope of the U phase motor current Iu in the regeneration period immediately after the start of the speed reducing period is steep. As a result, the U phase motor current Iu goes from positive to negative, and U phase motor current Iu flows in reverse. Because the regeneration period becomes shorter if the PWM frequency is set higher in the speed reducing period, the motor current can be prevented from being regenerated flowing in the regeneration period in the opposite direction of the motor current in the urging period, or the level of this current can be prevented from rising in the regeneration period.

More specifically, motor current can be prevented from flowing to the power supply after the next urging period starts, and an accompanying rise in the power supply voltage can be prevented.

The PWM frequency is changed in this first embodiment of the invention by switching between two PWM frequencies, but the PWM frequency can be controlled in more steps or continuously linearly based on the torque control signal EC and rotational speed signal NR. In a speed reducing period when the torque control signal EC is less than or equal to a predetermined value determined by the rotational speed signal NR, the effect of the present invention can be achieved by controlling the PWM frequency to a level higher than normal.

For brevity this embodiment of the invention is described with a 120° energizing control method, but other methods, such as 180° energizing, can be used to the same effect. The arrangement of the invention is not particularly limited and the same effect can be achieved insofar as the PWM frequency changes during the speed reducing period in which the torque control signal EC is less than or equal to a predetermined level determined by the rotational speed signal NR of the motor 2.

As described above, this first embodiment of the invention detects the speed reducing period in which the torque control signal EC is below the rotational speed signal NR, and the PWM frequency is changed to a frequency that is higher than during normal drive control as a result of detecting this change in the torque control signal EC level. This embodiment of the invention can therefore prevent a rise in the power supply voltage as a result of motor current backflow to the power supply resulting from a torque reduction command or change in load, for example. Capacitors and diodes for preventing a power supply voltage rise due to motor current backflow to the power supply are therefore not needed, and the cost and size of the motor drive device can be reduced.

Second Embodiment

A motor drive device that uses a current controlled PWM drive arrangement is described in the first embodiment above, but the invention can also be applied to voltage controlled PWM drive arrangements. A first aspect of a voltage controlled PWM drive arrangement according to the present invention is described in this second embodiment of the invention below with reference to FIG. 5 to FIG. 7. Primarily the differences between this embodiment and the first embodiment are described below wherein like parts are identified by like reference numerals and further description thereof is omitted.

Figure 5:
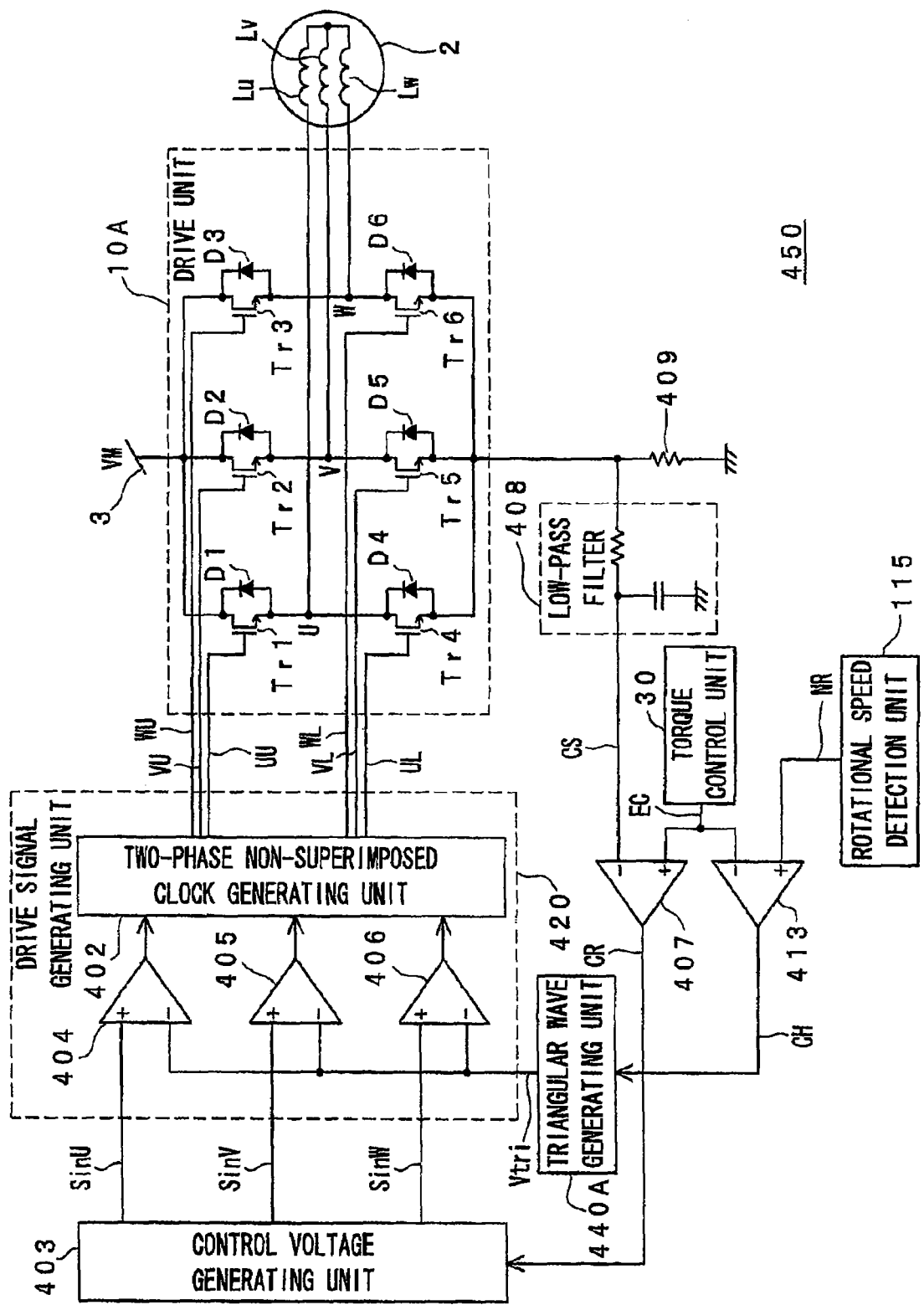
FIG. 5 is a block diagram of a motor drive device 450 in a second embodiment of the invention.

The motor drive device 450 shown in FIG. 5 drives a motor 2 by a drive unit 10A having a three-phase bridge configuration. The voltage detected from detection resistance 409 is input through low-pass filter 408 to amplifier 407.

The amplifier 407 amplifies the difference between the torque control signal EC set by the torque control unit 30 and the output voltage of the low-pass filter 408, and inputs the result to the control voltage generating unit 403.

Based on the output from the amplifier 407, the control voltage generating unit 403 inputs three-phase sine wave control signals SinU, SinV, SinW to the drive signal generating unit 420. The drive signal generating unit 420 includes comparators 404, 405, 406 and two-phase non-superimposed clock generating unit 402.

To prevent drive unit 10A shoot-through, the two-phase non-superimposed clock generating unit 402 generates pulse pairs having a specific offset in the timing of the rising and falling edges, and supplies the drive signals UU, UL, VU, VL, WU, WL to the drive unit 10A.

The rotational speed detection unit 115 detects the speed of the motor 2 and outputs the rotational speed signal NR to the non-inverting input terminal of comparator 413.

The comparator 413 compares the torque control signal EC input to the inverting input terminal with the rotational speed signal NR, and outputs the result to triangular wave generating unit 440A.

Operation of this motor drive device 450 is described next.

The average current flow through the drive unit 10A is detected as a DC voltage by the detection resistance 409 and low-pass filter 408. The difference between the current detection signal CS denoting the detection result and the torque control signal EC is amplified by the amplifier 407.

The control voltage generating unit 403 generates the three-phase sine wave control signals SinU, SinV, SinW with amplitude proportional to the output voltage of the amplifier 407. The comparator 404 compares U phase control signal SinU with triangular wave signal Vtri, and outputs the result to two-phase non-superimposed clock generating unit 402.

To prevent drive unit 10A shoot-through, the two-phase non-superimposed clock generating unit 402 generates pulse pairs with a specific timing offset between the rising and falling edges, and supplies the U phase high potential side drive signal UU and U phase low potential side drive signal UL to the drive unit 10A. Comparator 405 and comparator 406 likewise compare V phase control signal SinV and W phase control signal SinW respectively having a 120° and 240° phase offset from U phase control signal SinU with the triangular wave signal Vtri, and supply the corresponding phases of the drive unit 10A through the two-phase non-superimposed clock generating unit 402.

This motor drive device 450 thus drives a motor 2 as a result of the control voltage generating unit 403 generating three-phase sine wave control signals SinU, SinV, SinW, the drive signal generating unit 420 pulse width modulating the control signals, and the switching devices of the drive unit 10A PWM switching the drive power from the power supply 3 based on the resulting drive signals UU-WL.

The rotational speed detection unit 115 detects the rotational speed of the motor 2, generates a rotational speed signal NR denoting this motor speed, and outputs the rotational speed signal NR to the comparator 413.

The arrangement for acquiring information about the rotational speed of the motor 2 could detect the rotational position of the rotor using Hall effect devices or other magnetic sensors and convert this position information to the rotational angle per time unit. Alternatively, the arrangement could detect the level of back electromotive force based on the terminal voltage detected from the motor 2 terminals and determine the speed proportional to this back electromotive force. Further alternatively, the rotational position of the rotor could be detected based on the back electromotive force and converted to a rotational angle per time unit. This rotational speed information is a timing pulse of a frequency proportional to the rotational speed, for example, and is converted by an integration circuit, for example, to a voltage that is proportional to the rotational speed of the motor 2 and is output as rotational speed signal NR.

The comparator 413 compares torque control signal EC and rotational speed signal NR, and outputs the result of this comparison as speed difference detection signal CH to the triangular wave generating unit 440A.

Before being input to the comparator 413 the rotational speed signal NR can be passed through a low-pass filter, for example, to remove noise and prevent operating errors in the comparator 413 and downstream.

During the normal drive period in which torque control signal EC is higher than rotational speed signal NR, the speed difference detection signal CH goes LOW. In the speed reducing period when the torque control signal EC is lower than the rotational speed signal NR level, the speed difference detection signal CH goes HIGH. The triangular wave generating unit 440A outputs the triangular wave signal Vtri enabling PWM control to the drive signal generating unit 420.

If the frequency of the triangular wave signal Vtri generated by triangular wave generating unit 440A is a first PWM frequency in the normal drive period when speed difference detection signal CH is LOW, when the speed difference detection signal CH is HIGH in the speed reducing period, the frequency of triangular wave signal Vtri is a second PWM frequency which is higher than the first PWM frequency. The frequency of the triangular wave signal Vtri can be increased using a triangular wave generating circuit block that generates a triangular wave by charging/discharging a capacitor with a constant current, and increasing the current level for charging/discharging the capacitor, for example.

Figure 6:
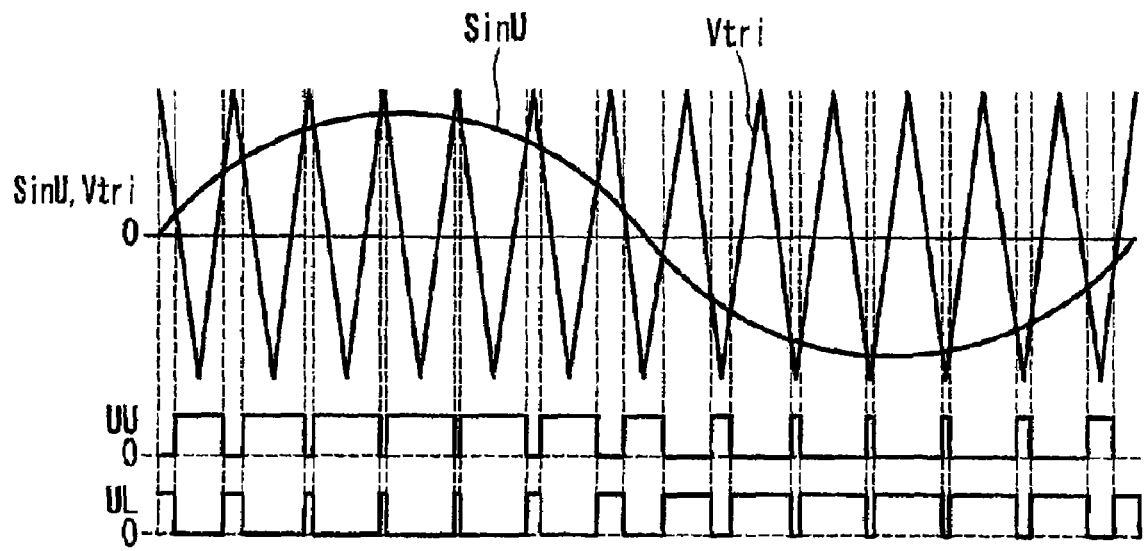
FIG. 6 is a timing chart describing the operation of the drive signal generating unit 420 included in the motor drive device 450 shown in FIG. 5.

FIG. 6 is a timing chart describing operation of the drive signal generating unit 420 in the U phase in FIG. 5. For simplicity the timing offset produced by the two-phase non-superimposed clock generating unit 402 is omitted in FIG. 6.

When the U phase control signal SinU is high compared with the triangular wave signal Vtri, the U phase high potential side drive signal UU goes HIGH and the U phase high potential side switching device Tr1 turns on. At the same time U phase low potential side drive signal UL goes LOW and U phase low potential side switching device Tr4 goes off.

Conversely, when the U phase control signal SinU is low relative to the triangular wave signal Vtri, the U phase high potential side drive signal UU goes LOW and U phase high potential side switching device Tr1 goes off. At the same time the U phase low potential side drive signal UL goes HIGH and the U phase low potential side switching device Tr4 turns on.

As in the description of the current controlled PWM drive arrangement shown in the first embodiment, operation of the voltage controlled PWM drive arrangement according to this second embodiment of the invention during the speed reducing period is described next.

Figure 7:
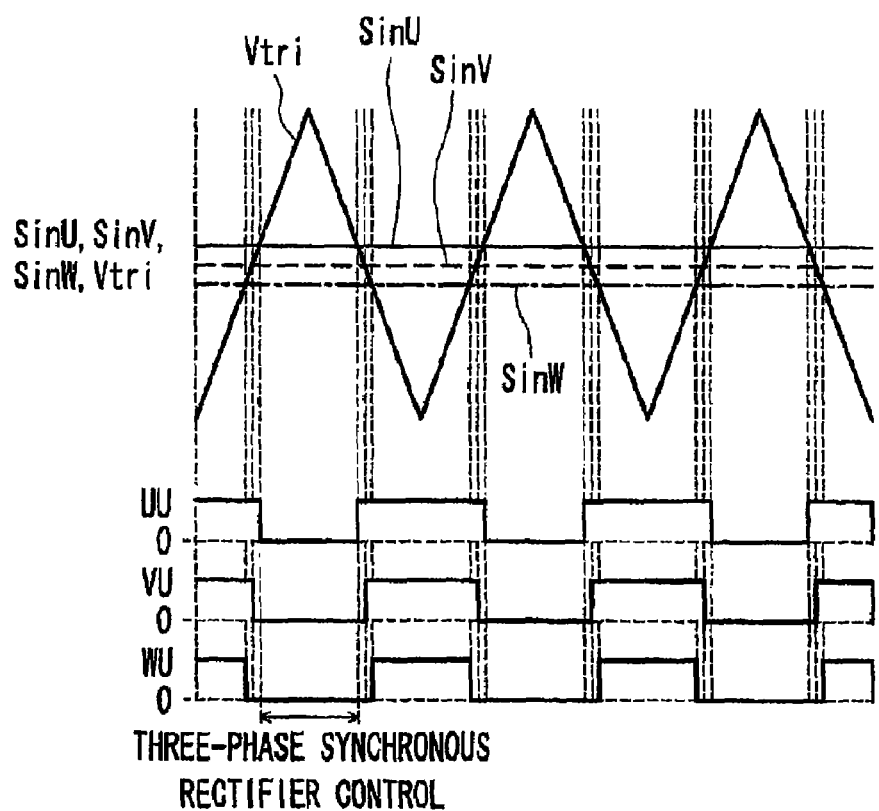
FIG. 7 is a timing chart describing the operation of the torque control signal EC in FIG. 5.

FIG. 7 is a timing chart of the drive signal generating unit 420 shown in FIG. 6, and shows a situation in which the torque control signal EC level is low.

As shown in FIG. 7, the amplitude of the three-phase sine wave control signals SinU, SinV, SinW decreases when the torque control signal EC is low, and the drive signals UU-WL are generated with a pulse width having an approximately 50% duty. As a result, the period in which the high potential side switching devices are off for all three phases, that is, the three-phase regeneration period in which the low potential side switching devices are off for all three phases, becomes longer than the normal rotation period. Because the back electromotive force is sufficiently high just after the speed reducing period, the back electromotive force during this three-phase regeneration period causes the motor current to start flowing in the opposite direction as during the urging period. Therefore, if the U phase high potential side switching device is on when the next urging period starts after the three-phase regeneration period, the motor current flows through the switching device back to the power supply 3 and the power supply voltage rises. Note that for brevity the period in which both the high potential side and low potential side switching devices are off in order to prevent shoot-through is omitted here, but more precisely the motor current starts flowing back to the power supply 3 through a diode parallel connected to the U phase high potential side switching device when U phase synchronous rectifier control ends.

This embodiment of the invention thus prevents back electromotive force from reversing the direction of motor current flow and thus prevents the power supply voltage from rising in a speed reducing period because the three-phase regeneration period in which all low potential side switching devices of the drive unit 10A are off becomes shorter as the PWM frequency rises.

Third Embodiment

A third embodiment of the invention is described below with reference to FIG. 8 to FIG. 10. This embodiment of the invention differs from the first embodiment in the arrangement of the energizing control unit 100 and the arrangement for generating the drive signals UU-WL.

The motor drive device 250 according to this embodiment of the invention includes a PWM control unit 90E that differs internally from the arrangement of the PWM control unit 90D and an energizing control unit 100B that differs internally from the arrangement of the energizing control unit 100 in the motor drive device 200 of the first embodiment. Other aspects of the arrangement and operation of this embodiment are the same as described in the first embodiment. Like parts and signals in this third embodiment of the invention are also identified by the same reference numerals shown in FIG. 1.

Figure 8:
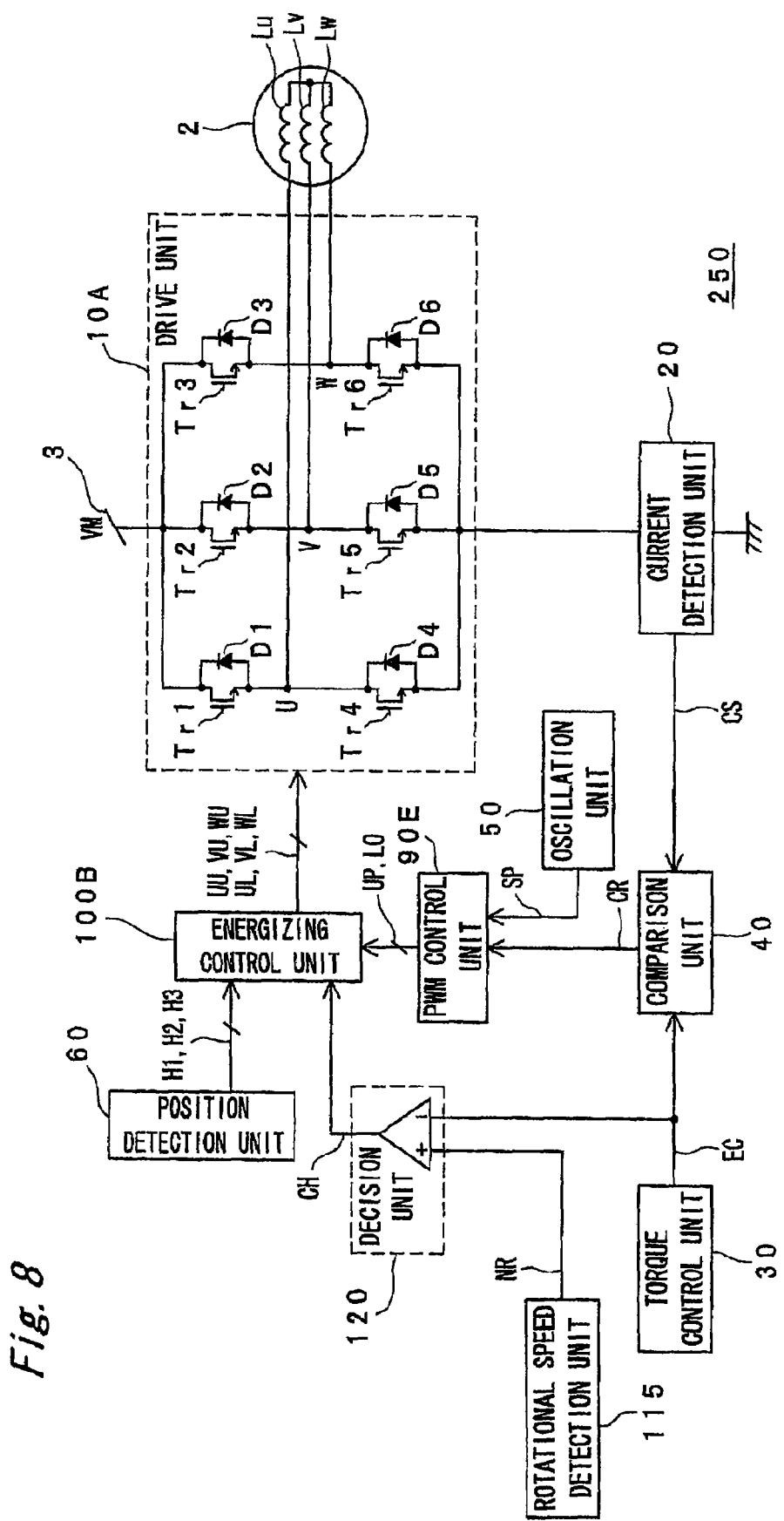
FIG. 8 is a block diagram of the motor drive device 250 according to a third embodiment of the invention.

FIG. 8 is a block diagram showing the arrangement of the motor drive device 250 in this third embodiment of the invention. The decision unit 120 inputs the speed difference detection signal CH to energizing control unit 100B in this embodiment instead of to the motor drive device 200 as in the first embodiment.

Based on the set signal SP and reset signal CR, the PWM control unit 90E generates and outputs to the energizing control unit 100B a high potential side drive signal UP and a low potential side drive signal LO for a desired phase where both drive signals have a non-superimposed period for preventing drive unit 10A shoot-through.

Figure 9:
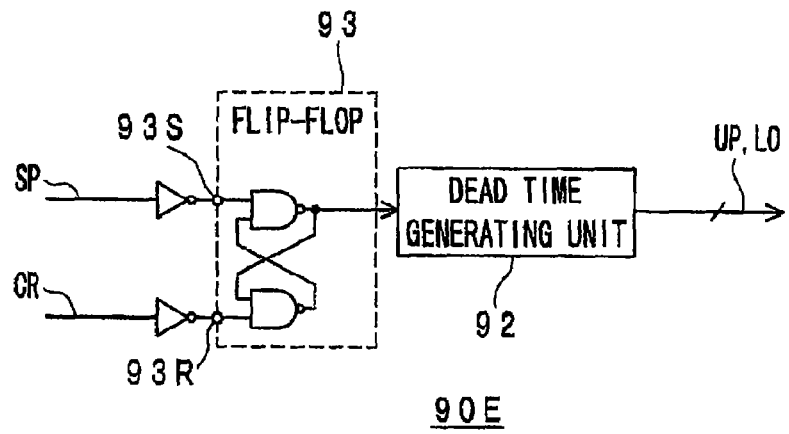
FIG. 9 is a circuit diagram showing a specific arrangement of the PWM control unit 90E in FIG. 8.

FIG. 9 is a circuit diagram of the PWM control unit 90E. The PWM control unit 90E includes a dead time generating unit 92 and flip-flop 93. The inverted set signal SP is applied to the set pin 93S of the flip-flop 93, and the inverted reset signal CR is applied to the reset pin 93R The dead time generating unit 92 generates and outputs to the energizing control unit 100B a high potential side drive signal UP and a low potential side drive signal LO for a desired phase where both drive signals have a non-superimposed period for preventing drive unit 10A shoot-through.

The energizing control unit 100B generates and outputs to the drive unit 10A drive signals UU-WL for the switching devices Tr1 to Tr6 in the drive unit 10A based on the position detection signals H1, H2, H3, high potential side drive signal UP, and low potential side drive signal LO to enable 120° energizing control, and controls braking the drive unit 10A based on the speed difference detection signal CH.

The energizing control unit 100B uses inversion control to reverse the drive signals UU-WL applied to the high potential side and low potential side switching devices of the drive unit 10A when the speed difference detection signal CH is HIGH, for example.

Figure 10:
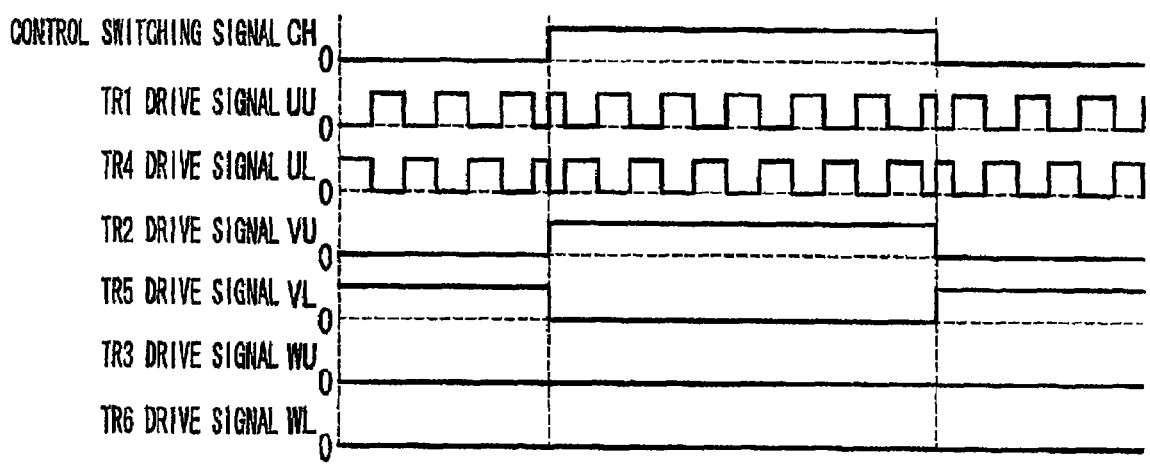
FIG. 10 is a timing chart describing the operation of the energizing control unit 100B in FIG. 8.

FIG. 10 is a timing chart describing operation of the energizing control unit 100B. The timing chart in FIG. 10 shows operation in the UV energizing period.

As shown in FIG. 10, when the speed difference detection signal CH is HIGH in the UV energizing period, that is, during a speed reducing period, the energizing control unit 100B interchanges the high potential side drive signals UU, VU, WU and the low potential side drive signals UL, VL, WL for each phase. More specifically, the drive unit 10A applies reverse braking control.

During the speed reducing period in which braking control is applied the direction in which the motor current produced by the back electromotive force of the motor 2 flows is the same as the direction in which the motor current supplied from the power supply 3 to the motor 2 flows when braking control is applied. As a result, the direction in which the motor current flows due to the effect of back electromotive force during the regeneration period does not change, and the motor current can be prevented from flowing back to the power supply 3. A rise in the power supply voltage due to the motor current flowing back to the power supply can therefore be prevented.

Braking control of the energizing control unit 100B based on the speed difference detection signal CH is not limited to reverse braking control as described above. Short-circuited braking control is also possible by turning all high potential side switching devices of the drive unit 10A off and all low potential side switching devices on, or turning all high potential side switching devices on and all low potential side switching devices off. Further alternatively, reverse braking control and short-circuited braking control can be used in combination, such as applying reverse braking control for a predetermined time followed by short circuited braking control, or applying short circuit control for a predetermined time followed by reverse braking control.

For brevity this embodiment of the invention is described with a 120° energizing control method, but other methods, such as 180° energizing, can be used to the same effect. The arrangement of the invention is not particularly limited and the same effect can be achieved insofar as braking control is applied during the speed reducing period in which the torque control signal EC is less than or equal to a predetermined level determined by the rotational speed signal NR of the motor 2.

As described above, this embodiment of the Invention detects the speed reducing period in which the torque control signal EC is below the rotational speed signal NR, and applies braking control to the motor 2 as a result of detecting this speed reducing period. This embodiment of the invention can therefore prevent a rise in the power supply voltage as a result of motor current backflow to the power supply resulting from a torque reduction command or change in load, for example. Capacitors and diodes for preventing a power supply voltage rise due to motor current backflow to the power supply are therefore not needed, and the cost and size of the motor drive device can be reduced.

Fourth Embodiment

The third embodiment of the invention describes a motor drive device that uses a current controlled PWM drive arrangement, but the present invention can also be applied to voltage controlled PWM drive arrangements. This fourth embodiment describes a voltage controlled PWM drive configuration of the third embodiment.

Figure 11:
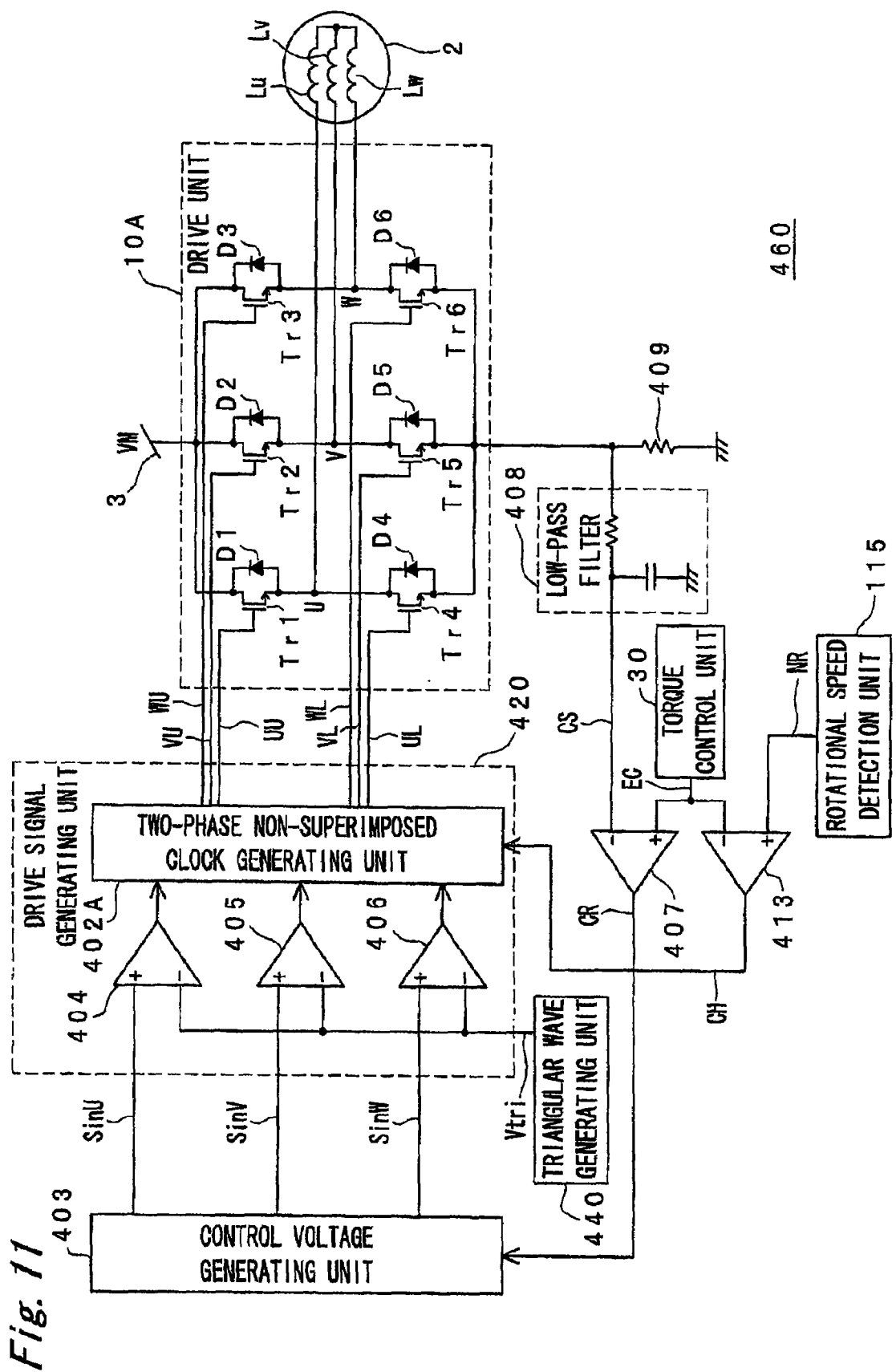
FIG. 11 is a block diagram of the motor drive device 460 according to a fourth embodiment of the invention.
Figure 12:
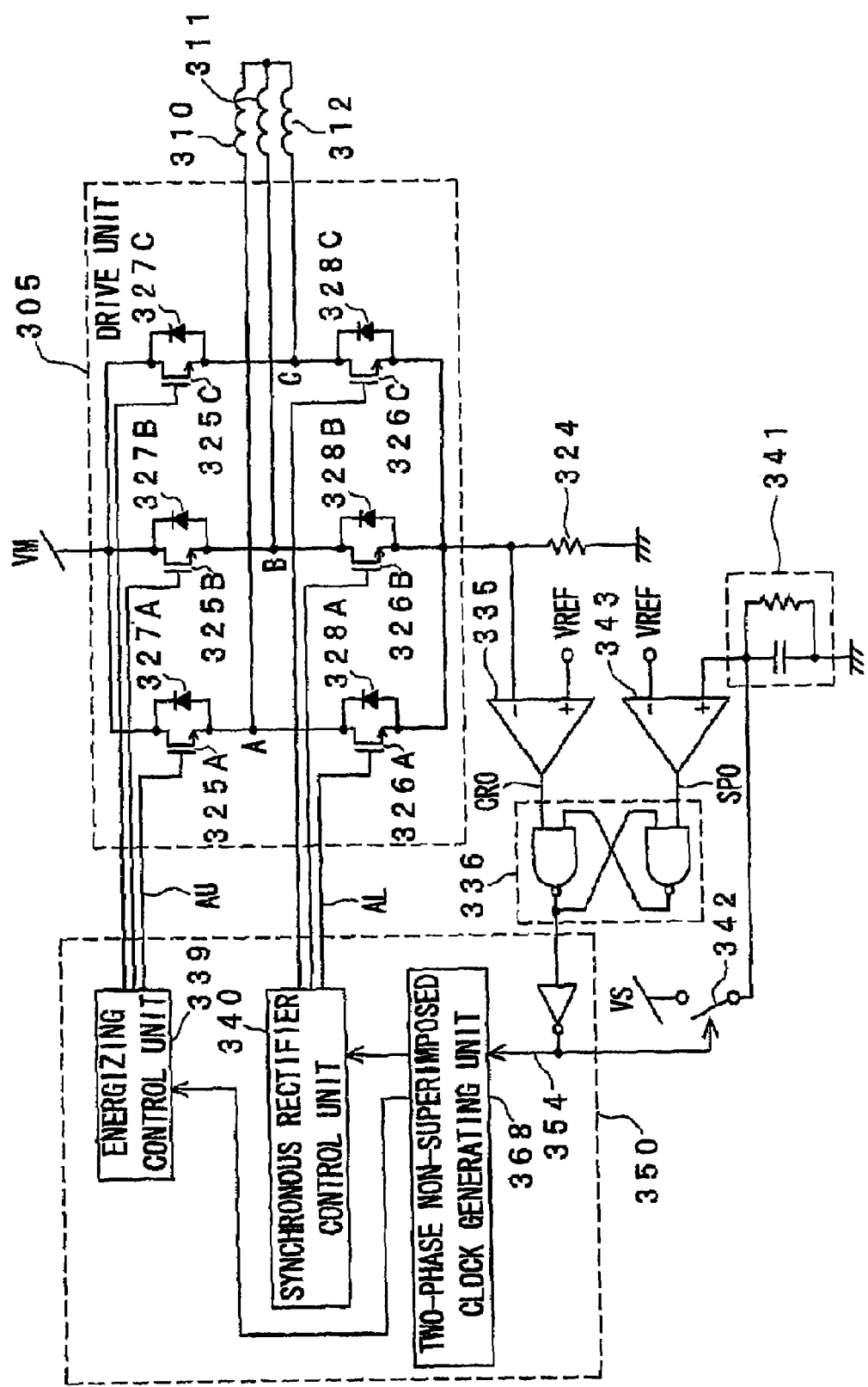
FIG. 12 is a circuit diagram of a motor drive device according to the related art.
Figure 13:
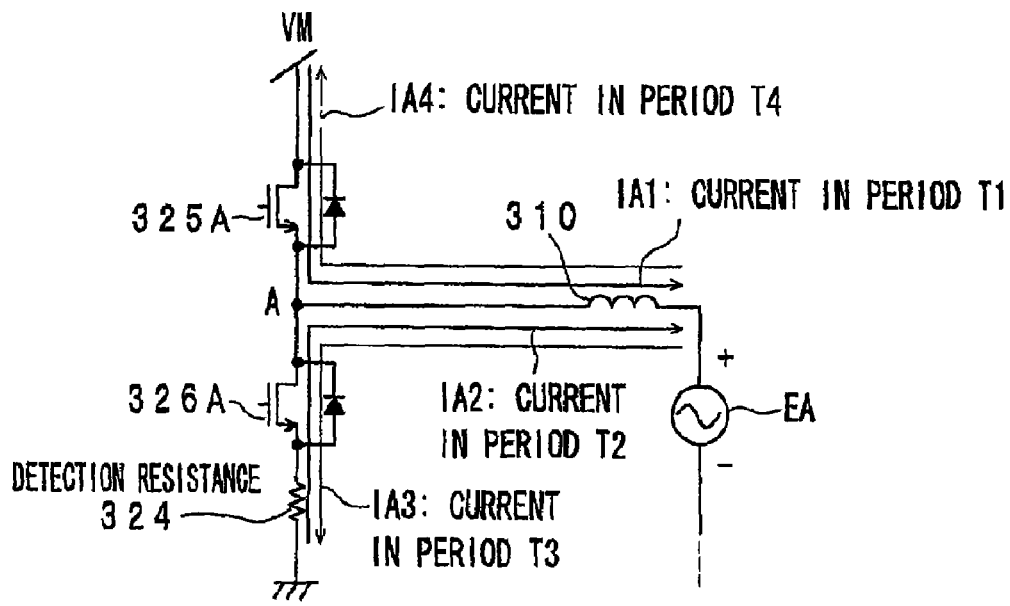
FIG. 13 is a circuit diagram describing the direction of flow of the phase A motor current in the motor drive device of the related art shown in FIG. 12.
Figure 14:
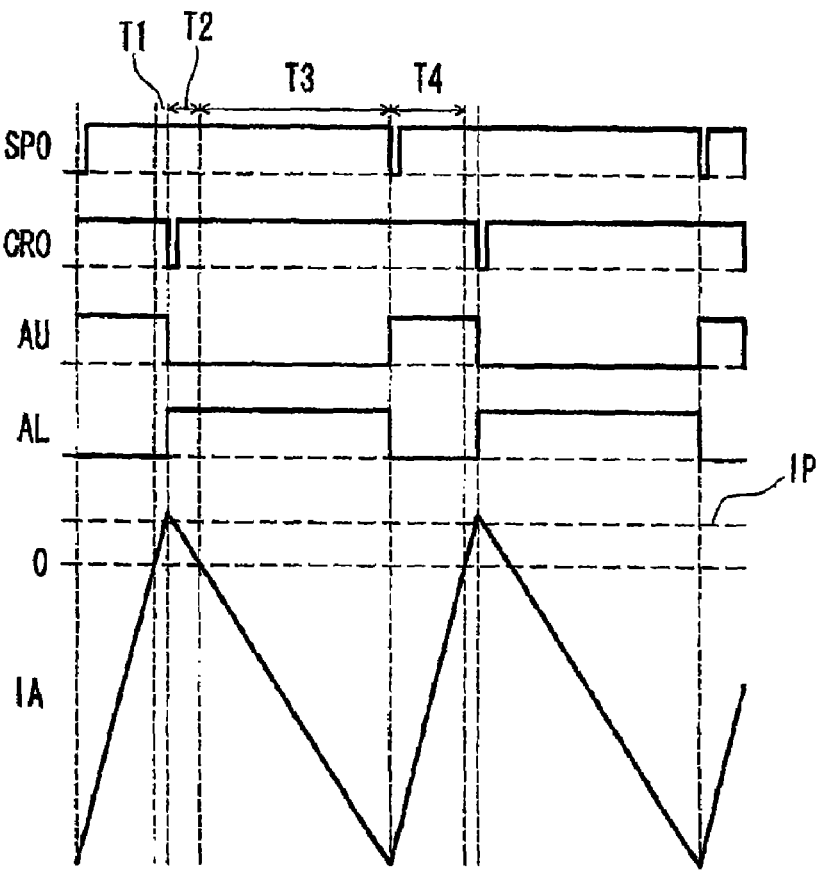
FIG. 14 is a timing chart describing the direction of flow of the phase A motor current in the motor drive device of the related art shown in FIG. 12.

FIG. 11 is a schematic diagram of the present invention when applied to a voltage controlled PWM drive arrangement. The motor drive device 460 shown in FIG. 11 has a triangular wave generating unit 440 and two-phase non-superimposed clock generating unit 402A that differ internally from the corresponding devices of the motor drive device 450 shown in FIG. 5. Other aspects of the arrangement and operation of this embodiment are the same as the motor drive device 450 shown in FIG. 5. Like parts and signals in this fourth embodiment of the invention are also identified by the same reference numerals shown in FIG. 5.

The triangular wave generating unit 440 generates triangular wave signal Vtri of the same first PWM frequency in both the normal rotation period and the speed reducing period. The comparator 413 compares torque control signal EC and rotational speed signal NR and outputs the resulting speed difference detection signal CH to the two-phase non-superimposed clock generating unit 402A. In the speed reducing period when the speed difference detection signal CH is HIGH, the two-phase non-superimposed clock generating unit 402A outputs drive signals UU-WL for braking control to the drive unit 10A.

The arrangement for generating drive signals UU-WL for braking control could be an reverse braking control arrangement that interchanges high potential side drive signals UU, VU, WU and low potential side drive signals UL, VL, WL, or a short-circuiting braking control method that sets all high potential side drive signals UU, VU, WU HIGH and all low potential side drive signals UL, VL, WL LOW.

Thus comprised the drive unit 10A applies braking control in the speed reducing period in which the torque control signal EC level is below the rotational speed signal NR level. As a result, the direction in which the motor current produced by the back electromotive force of the motor 2 flows in the regeneration period is the same as the direction in which the motor current produced by braking control flows. The back electromotive force is thus prevented from reversing the direction of motor current flow, and a rise in the power supply voltage caused by the back electromotive force can be prevented. Capacitors and diodes for preventing a power supply voltage rise due to motor current backflow to the power supply are therefore not needed, and the cost and size of the motor drive device can be reduced.

The invention is described herein using a three-phase motor by way of example, but the invention can be used with an N-phase motor (where N is an integer of 2 of more) with the same effect. The foregoing embodiments of the invention also simply describe the invention specifically and the invention is not limited to these examples.

The present invention can be used in a motor drive device and a motor drive method.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A motor drive device operable to supply drive power to a motor to drive the motor, comprising:
   a drive signal generator operable to generate a drive signal;
   a driver operable to produce the drive power based on the drive signal;
   a torque control signal generator operable to generate a torque control signal specifying the motor torque;
   a speed detector operable to detect the rotational speed of the motor and to generate a rotational speed signal denoting motor speed information; and
   a speed difference detector operable to generate a first speed difference detection signal if the rotational speed signal is greater than the torque control signal and a second speed difference detection signal if the rotational speed signal is less than the torque control signal;
   wherein said drive signal generator is controlled based on the first and second speed difference detection signals.

2. The motor drive device described in claim 1, wherein said drive signal generator generates a drive signal having a first frequency if the first speed difference detection signal is generated and a second frequency if the second speed difference detection signal is generated.

3. The motor drive device described in claim 1, wherein:
   said driver comprises high potential side switching devices for N phases (where N is an integer greater than or equal to 2) and low potential side switching devices for N phases; and
   said drive signal generator produces N-phase high potential side drive signals operable to control each of the N-phase high potential side switching devices, and N-phase low potential side drive signals operable to control each of the N-phase low potential side switching devices.

4. The motor drive device described in claim 3, wherein:
   said drive signal generator enables short-circuited braking control operable to control the logic level of all N-phase high potential side drive signals to a non-operating state level and the logic level of all N-phase low potential side drive signals to an operating state level, or the reverse, when the speed difference detection signal is generated.

5. The motor drive device described in claim 3, wherein:
   said drive signal generator enables reverse braking control whereby the N-phase high potential side drive signals are controlled by the N-phase low potential side drive signals, and the N-phase low potential side drive signals are controlled by the N-phase high potential side drive signals.

6. The motor drive device described in claim 1, wherein said speed detector generates the rotational speed signal based on the output of a rotational phase sensor operable to send the rotational phase of the motor.

7. The motor drive device described in claim 1, wherein said speed detector generates the rotational speed signal based on the back electromotive force of the motor.

8. The motor drive device described in claim 1, further comprising a current detection unit operable to detect the motor current level and to generate a current detection signal;
   wherein said drive signal generator is controlled based on the difference between the current detection signal and torque control signal.

9. A motor drive method for supplying drive power to a motor and to drive a motor, the drive method comprising:
   generating a drive signal;
   producing the drive power based on the drive signal;
   generating a torque control signal specifying the motor torque;
   detecting the rotational speed of the motor and generating a rotational speed signal denoting motor speed information;
   generating a first speed difference detection signal if the rotational speed signal is greater than the torque control signal and a second speed difference detection signal if the rotational speed signal is less than the torque control signal; and
   controlling the drive signal based on the first and second speed difference detection signals.

* * * * *